UNITED STATES PATENT OFFICE 1,935,929

ACID DYESTUFF OF THE ANTHRAQUINONE SERIES

Karl Zahn and Heinrich Koch, Frankfort-on-the-Main-Hochst, Germany, assignors to General Aniline Works, Inc., New York, N. Y., a corporation of Delaware No Drawing. Application December 23, 1932, Serial No. 648,731, and in Germany January 6, 1932

6 Claims. (Cl. 260—60)

The present invention relates to acid dyestuffs of the anthraquinone series, more particularly it relates to valuable dyestuffs having the following general formula:

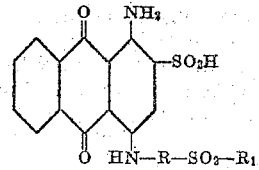

wherein R stands for an unsubstituted or substituted aromatic radical and $R_1$ for an alkyl radical or for a substituted alkyl radical, such as alkyl—OH, alkyl—COOH, or alkyl—COO. alkyl, the grouping —$SO_2$—$R_1$ standing in one of the positions meta and para in relation to the —NH— group.

Our new dyestuffs are obtainable by causing 1-amino-4-halogenanthraquinone-2-sulfonic acid or a salt thereof, such as an alkali metal salt, to react with a meta- or para-aminoaryl-alkyl-sulfone or a substitution product thereof containing a substituent or substituents in the aryl or alkyl radical or in both these radicals.

The condensation of the said components may be effected by heating them in the presence of water or a suitable organic diluent or a mixture of water and an organic diluent, while adding an acid binding agent, such as an alkali metal carbonate, acetate or bicarbonate and a small quantity of a catalytically acting substance, such as copper or a copper compound.

The new dyestuffs are distinguished by clear tints of good fastness properties, for instance, of good levelling power and dye the animal fiber from an acid bath blue tints.

It is surprising that the meta- and para-amino-aryl-alkyl-sulfones undergo the said condensation reaction with 4-halogen-1-amino-2-sulfonic acid or a salt thereof in such an easy manner, since, as we have found, the ortho-amino-aryl-alkylsulfones could not be condensed with the said halogen-anthraquinone sulfonic acid compound.

The present invention includes the free dyestuff-sulfonic acids and, of course, the salts thereof.

The following examples serve to illustrate the invention, but they are not intended to limit it thereto, the parts being by weight:

(1) 40 parts of the sodium salt of 1-amino-4-bromo-anthraquinone-2-sulfonic acid are heated for several hours at 60° C. to 70° C. with 25 parts of meta-aminophenyl-methylsulfone in 200 parts of water in the presence of 10 parts of sodium bicarbonate and 1 part of cuprous chloride, until the formation of the dyestuff is finished. The difficultly soluble sodium salt of the dyestuff thus formed can easily be isolated. The dyestuff is purified by re-dissolving it in water and again salting out by means of sodium chloride. In the dry state it forms a blue powder and dyes wool from an acid bath clear blue tints of very good levelling power. The dyestuff has the following structural formula:

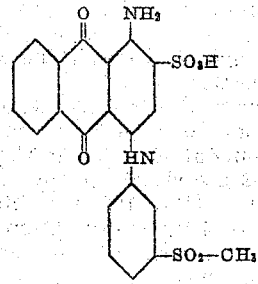

By using instead of meta-aminophenyl-methylsulfone the corresponding -ethylsulfone a blue dyestuff of similar properties is obtained. In like manner other meta-amino-phenyl-alkylsulfones containing other alkyl groups may be used.

(2) By using instead of 25 parts of meta-aminophenyl-methylsulfone 25 parts of para-aminophenyl-methylsulfone and by effecting the condensation at 70° C. to 80° C., there is likewise obtained a blue dyestuff which dyes wool from an acid bath clear blue tints and which corresponds to the formula:

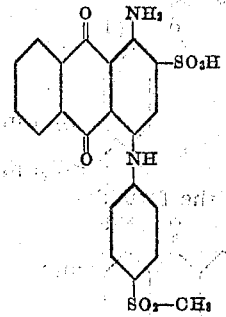

(3) 32 parts of the sodium salt of meta-aminophenylsulfone acetic acid are heated to gently boiling for several hours with 40 parts of the sodium salt of 1-amino-4-bromo-anthraquinone-2-sulfonic acid, 80 parts of a sodium carbonate solution of 10% strength, 1 part of cuprous chloride and 120 parts of water. The blue dyestuff thus formed is precipitated by acidifying the solution with dilute hydrochloric acid. It has the following formula:

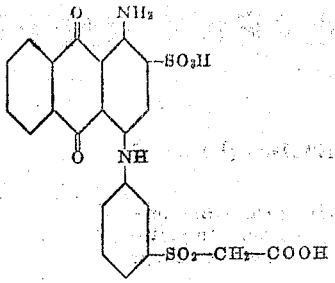

The dyestuff acid thus obtained may be transformed into its ethylester by means of ethylalcohol and gaseous hydrochloric acid; it corresponds to the following formula:

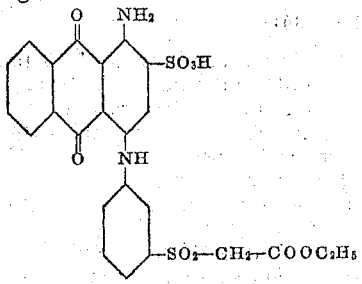

In like manner other alkylesters, such as the methyl- or propyl-ester may be formed.

Both dyestuffs—the free dyestuff acid as well as its ester—dye wool clear blue tints of good fastness properties.

(4) 40 parts of the sodium salt of 1-amino-4-bromo-anthraquinone-2-sulfonic acid are heated for several hours at 70° C. to 80° C. with 32 parts of 5-amino-2-acetylaminophenyl-methylsulfone (melting at 197° C. to 198° C.; obtainable from 2-acetyl-amino-phenylmethylsulfone by nitration and subsequent reduction), 40 parts of sodium carbonate solution of 10% strength, 20 parts of sodium-bicarbonate and 1 part of cuprous chloride in 240 parts of water. The dyestuff which has separated in a crystalline form, is purified in the usual manner; it dyes wool reddish-blue tints of very good levelling power. It corresponds to the formula:

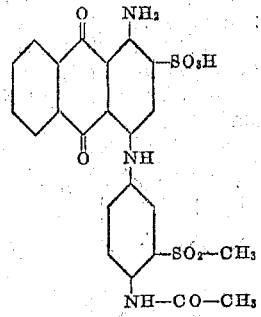

A dyestuff of the formula:

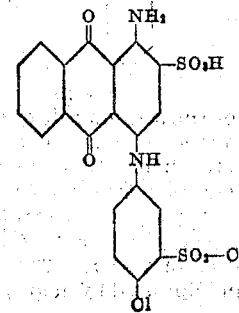

and of similar dyeing properties is obtained if instead of 32 parts of 5-amino-2-acetylaminophenyl-methylsulfone 32 parts of 5-amino-2-chloro-phenylmethylsulfone are used.

In an analogous manner the dyestuff:

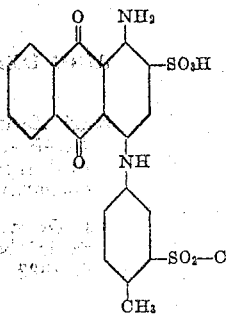
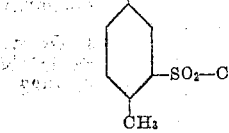

is formed by using 32 parts of 5-amino-2-methyl-phenyl-methylsulfone.

Other meta- or para-amino-phenylalkysulfones containing other substituents in the phenyl radical or being substituted in the alkyl radical may be used in an analogous manner.

(5) 26 parts of meta-aminophenyl-hydroxyethylsulfone, 40 parts of the sodium salt of 1-amino-4-bromo-anthraquinone-2-sulfonic acid, 16 parts of sodium-bicarbonate and 1 part of cuprous chloride are heated in 150 parts of water for several hours at 60° C. to 70° C. The dyestuff precipitates in the course of the condensation in the form of small brilliant crystals. In the dry state it forms a blue powder dyeing wool from an acid bath clear blue tints. The dyestuff has the following formula:

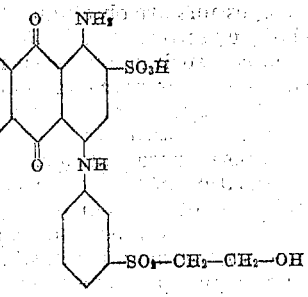
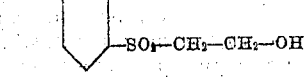

By using 26 parts of para-aminophenyl-hydroxyethylsulfone (melting at 107° C. to 108° C.) instead of meta-amino-phenyl-hydroxy-ethylsulfone, a dyestuff of similar properties is obtained which has the following formula:

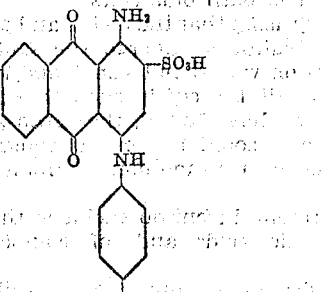
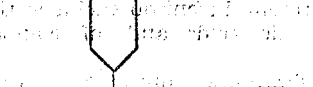

Dyestuffs containing higher hydroxyalkyl radicals attached to the SO₂ group may also be formed.

(6) 40 parts of the sodium salt of 1-amino-4-bromo-anthraquinone-2-sulfonic acid, 32 parts of 2 - amino - tetra - hydro-5.6.7.8-naphthyl-4-methylsulfone (melting at 129° C. to 131° C.), 20 parts of sodium-bicarbonate and 1 part of cuprous chloride are heated for 5-6 hours at 70° C. to 80° C. in 200 parts of water. The dyestuff precipitates in a crystalline form with a very good yield. It dyes wool from an acid bath clear reddish-blue tints. The dyestuff corresponds to the following formula:

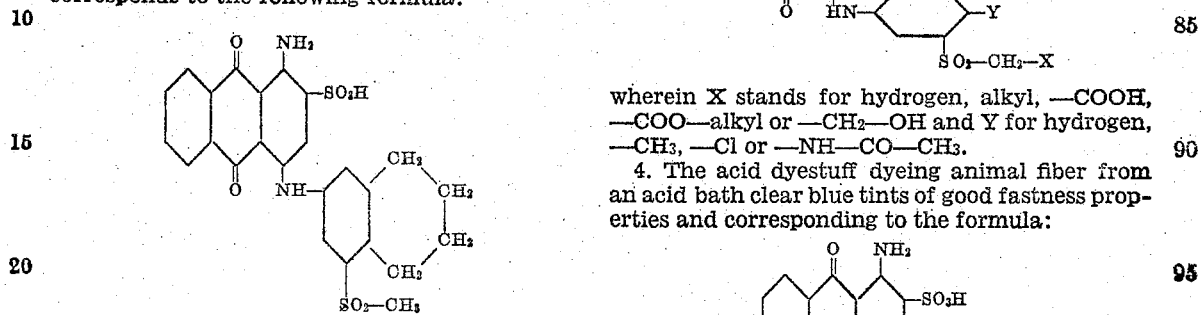

Dyestuffs having properties similar to those of the dyestuffs described in the before-mentioned examples are obtained by using components which are analogous to those disclosed in the specific examples.

We claim:

1. Acid dyestuffs dyeing animal fiber from an acid bath blue tints and corresponding to the general formula:

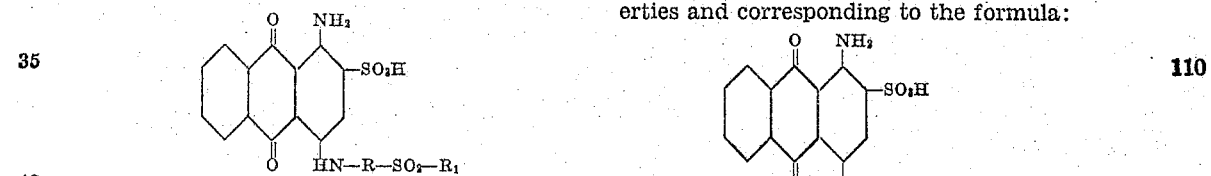

wherein R stands for an aromatic radical and $R_1$ for an alkyl radical, the grouping —$SO_2$—$R_1$ standing in one of the positions meta and para in relation to the —NH group.

2. Acid dyestuffs dyeing animal fiber from an acid bath blue tints and corresponding to the general formula:

wherein R stands for a radical of the benzene series and X represents hydrogen, —OH, —COOH or —COO—alkyl, the grouping —$SO_2$—alkylene.X standing in one of the positions meta and para in relation to the —NH—group.

3. Acid dyestuffs dyeing animal fiber from an acid bath blue tints and corresponding to the general formula:

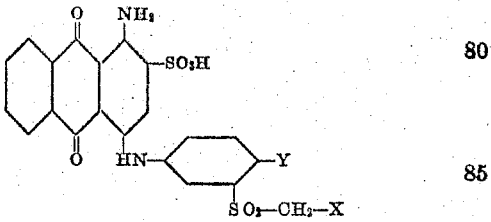

wherein X stands for hydrogen, alkyl, —COOH, —COO—alkyl or —$CH_2$—OH and Y for hydrogen, —$CH_3$, —Cl or —NH—CO—$CH_3$.

4. The acid dyestuff dyeing animal fiber from an acid bath clear blue tints of good fastness properties and corresponding to the formula:

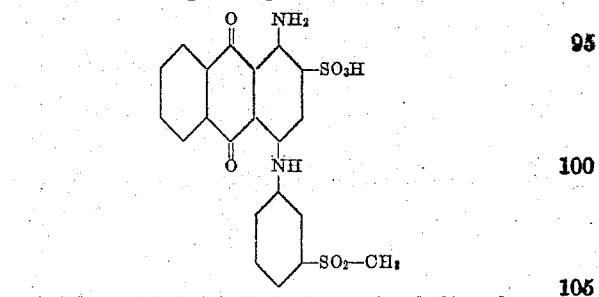

5. The acid dyestuff dyeing animal fiber from an acid bath clear blue tints of good fastness properties and corresponding to the formula:

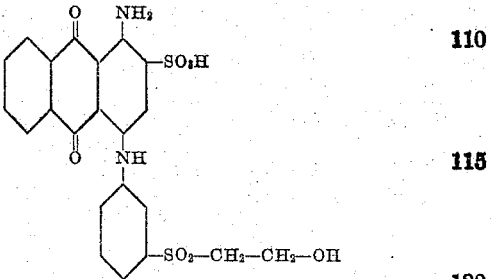

6. The acid dyestuff dyeing animal fibers from an acid bath clear blue tints of good fastness properties and corresponding to the formula:

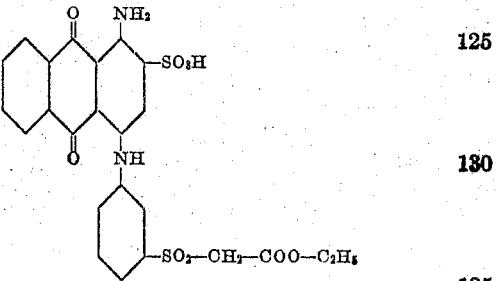

KARL ZAHN.
HEINRICH KOCH.